(12) United States Patent
Cornelissen

(10) Patent No.: US 10,376,087 B2
(45) Date of Patent: Aug. 13, 2019

(54) COOKING ATTACHMENT FOR A HEATABLE VESSEL OF A FOOD PROCESSOR

(71) Applicant: Vorwerk & Co. Interholding GmbH, Wuppertal (DE)

(72) Inventor: Markus Cornelissen, Bornheim (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 195 days.

(21) Appl. No.: 15/507,393

(22) PCT Filed: Aug. 20, 2015

(86) PCT No.: PCT/EP2015/069125
§ 371 (c)(1),
(2) Date: Feb. 28, 2017

(87) PCT Pub. No.: WO2016/037824
PCT Pub. Date: Mar. 17, 2016

(65) Prior Publication Data
US 2017/0258259 A1    Sep. 14, 2017

(30) Foreign Application Priority Data
Sep. 9, 2014 (DE) .......................... 10 2014 112 959

(51) Int. Cl.
*A23L 5/10* (2016.01)
*A47J 27/00* (2006.01)
(Continued)

(52) U.S. Cl.
CPC ................. *A47J 27/04* (2013.01); *A23L 5/13* (2016.08); *A47J 27/004* (2013.01);
(Continued)

(58) Field of Classification Search
CPC ...... A47J 27/04; A47J 27/004; A47J 43/0727; A23L 5/13
See application file for complete search history.

(56) References Cited

U.S. PATENT DOCUMENTS

| 5,794,524 A | 8/1998 | Kemker et al. |
| 2004/0159649 A1* | 8/2004 | Li .......................... A47J 27/004 |
| | | 219/436 |

FOREIGN PATENT DOCUMENTS

| DE | 10 2011 000 452 A1 | 8/2012 |
| EP | 2452599 | * 5/2012 |
| WO | 95/29615 A1 | 11/1995 |

OTHER PUBLICATIONS

Machine Translation Blagotinsek EP 2,452,599 , 2012.*
International Search Report of PCT/EP2015/069125, dated Oct. 2, 2015.

* cited by examiner

*Primary Examiner* — Erik Kashnikow
*Assistant Examiner* — Lela S. Williams
(74) *Attorney, Agent, or Firm* — Collard & Roe, P.C.

(57) ABSTRACT

A cooking attachment for a heatable vessel of a food processor, which cooking attachment has one or more base openings, through which steam exiting from the vessel can enter into the cooking attachment and condensate can flow out of the cooking attachment into the vessel. In order for food which is contained in the cooking attachment to be cooked more quickly and uniformly, and/or to be kept hot following preparation, irrespective of its position within the cooking attachment, it is proposed that the cooking attachment should have a heating device which provides heating irrespective of the steam exiting from the vessel.

9 Claims, 4 Drawing Sheets

Figure 1:
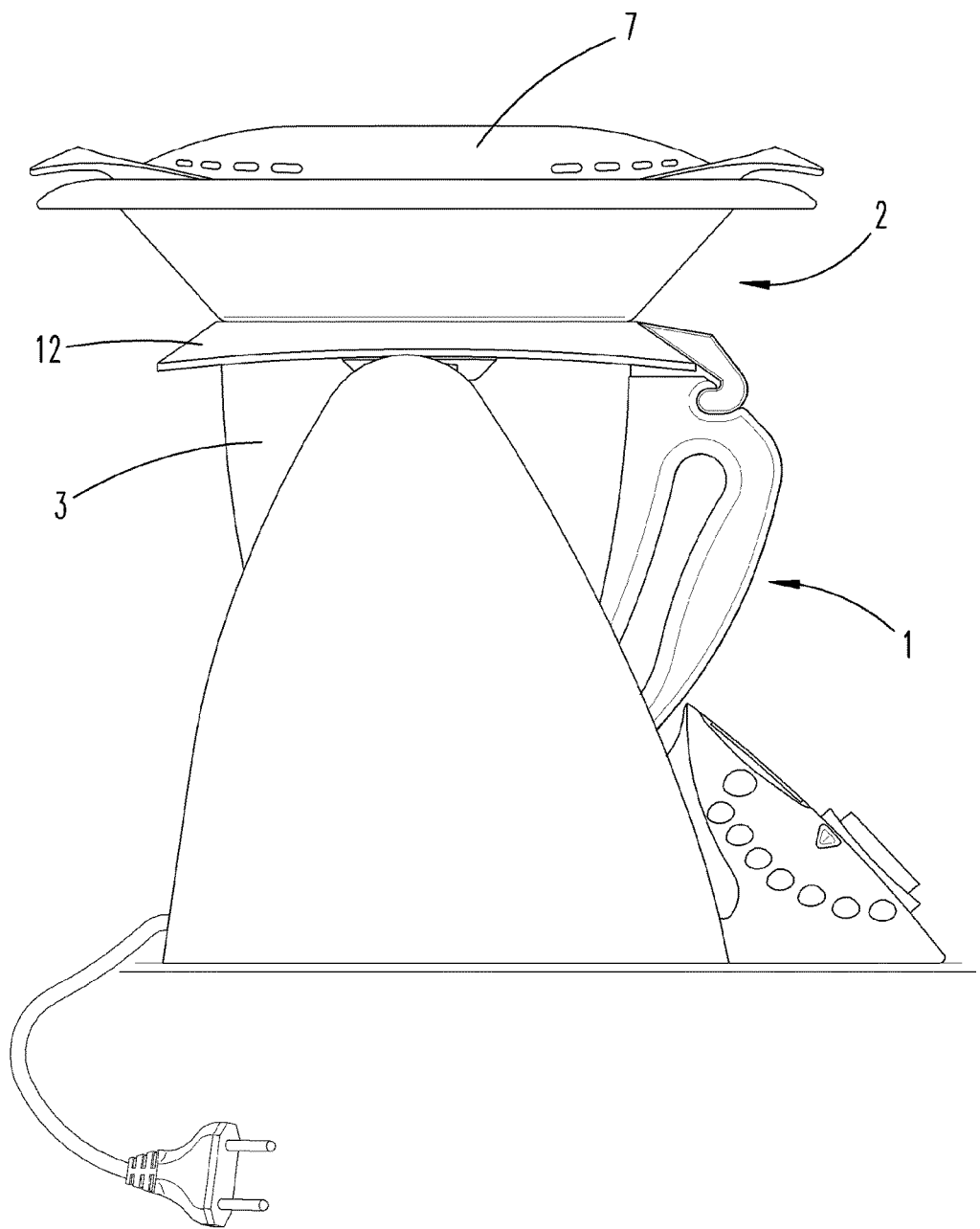

(51) Int. Cl.
*A47J 27/04* (2006.01)
*A47J 43/07* (2006.01)
(52) U.S. Cl.
CPC ....... *A47J 43/0727* (2013.01); *A23V 2002/00* (2013.01); *A47J 2027/043* (2013.01)

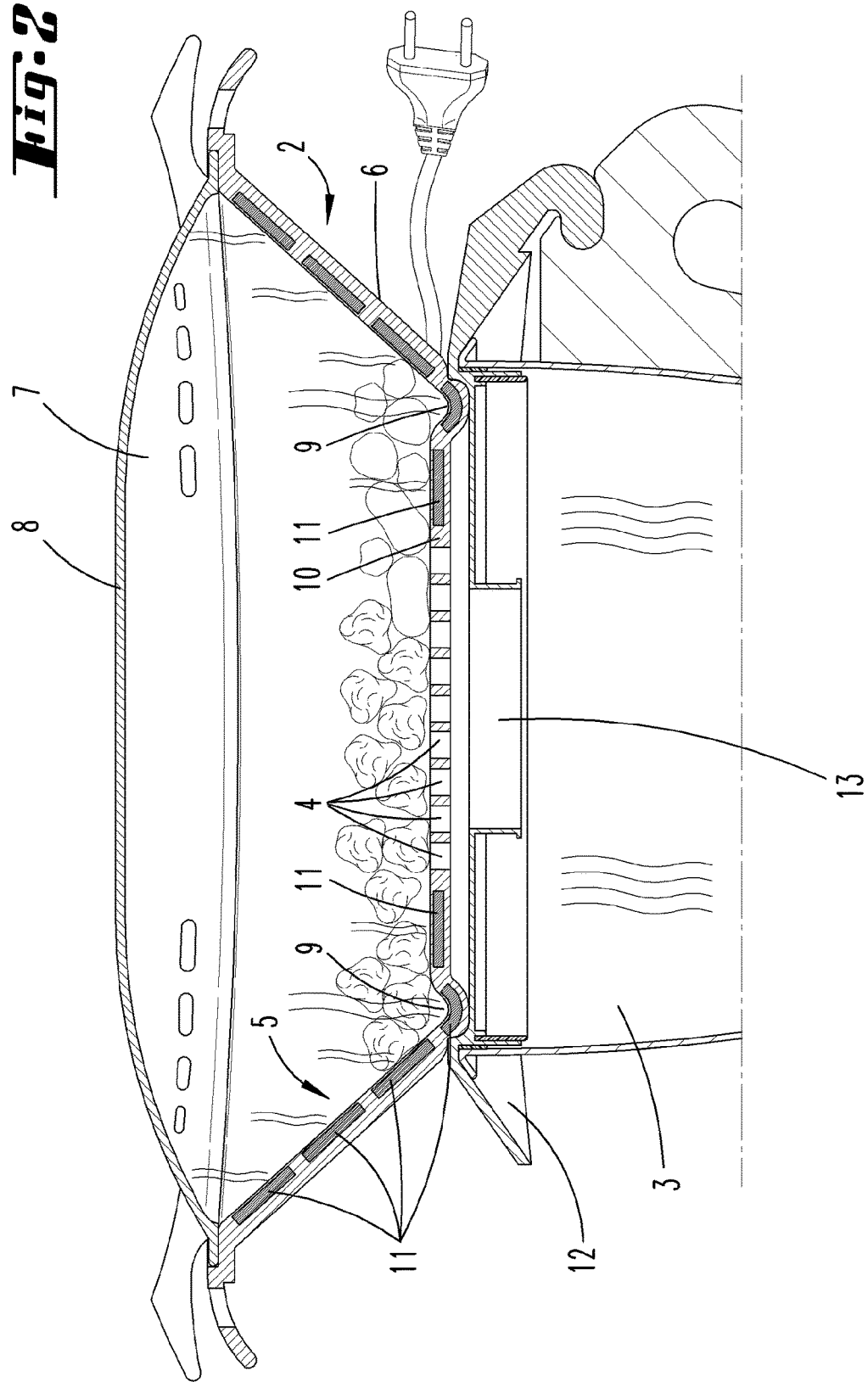

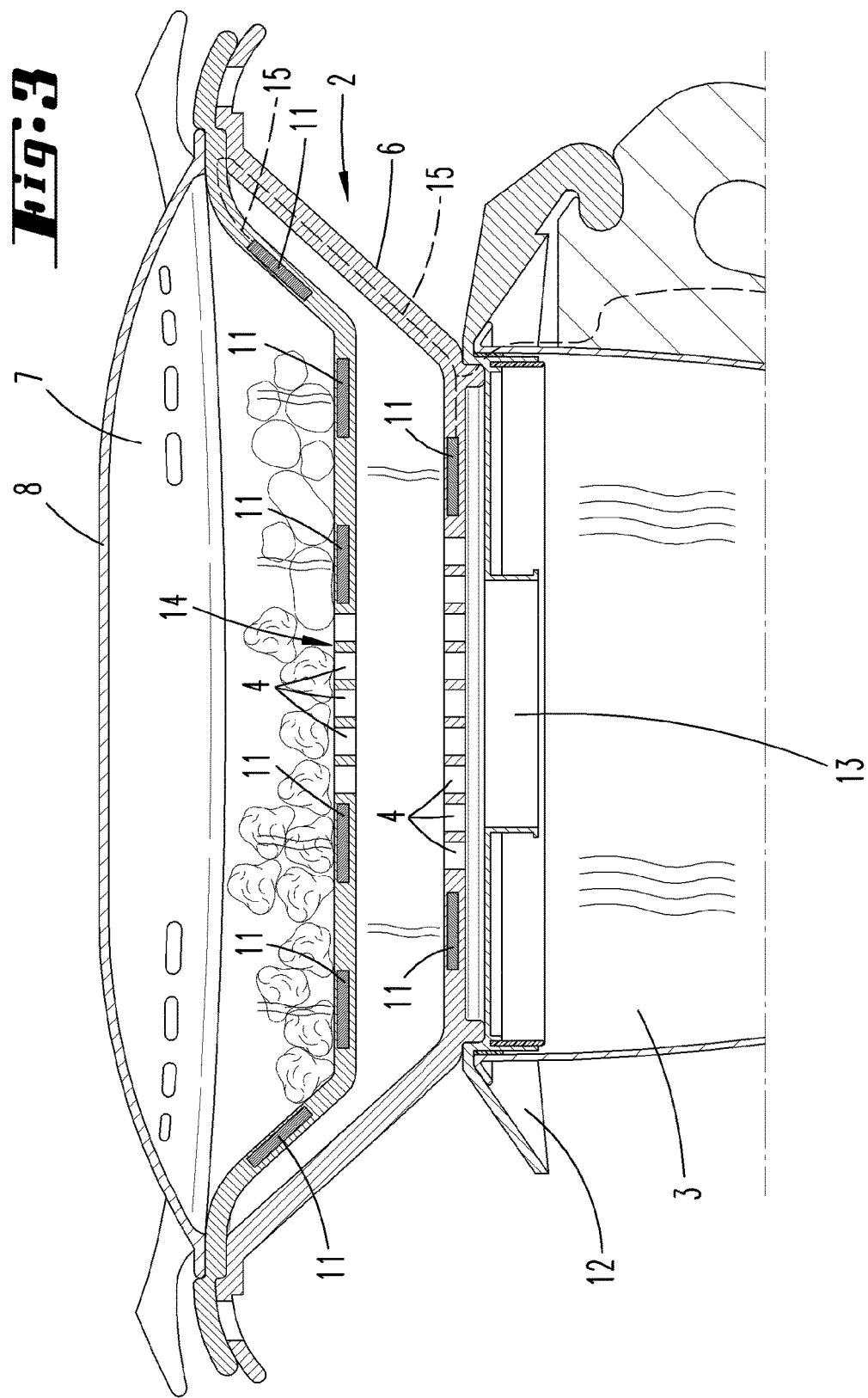

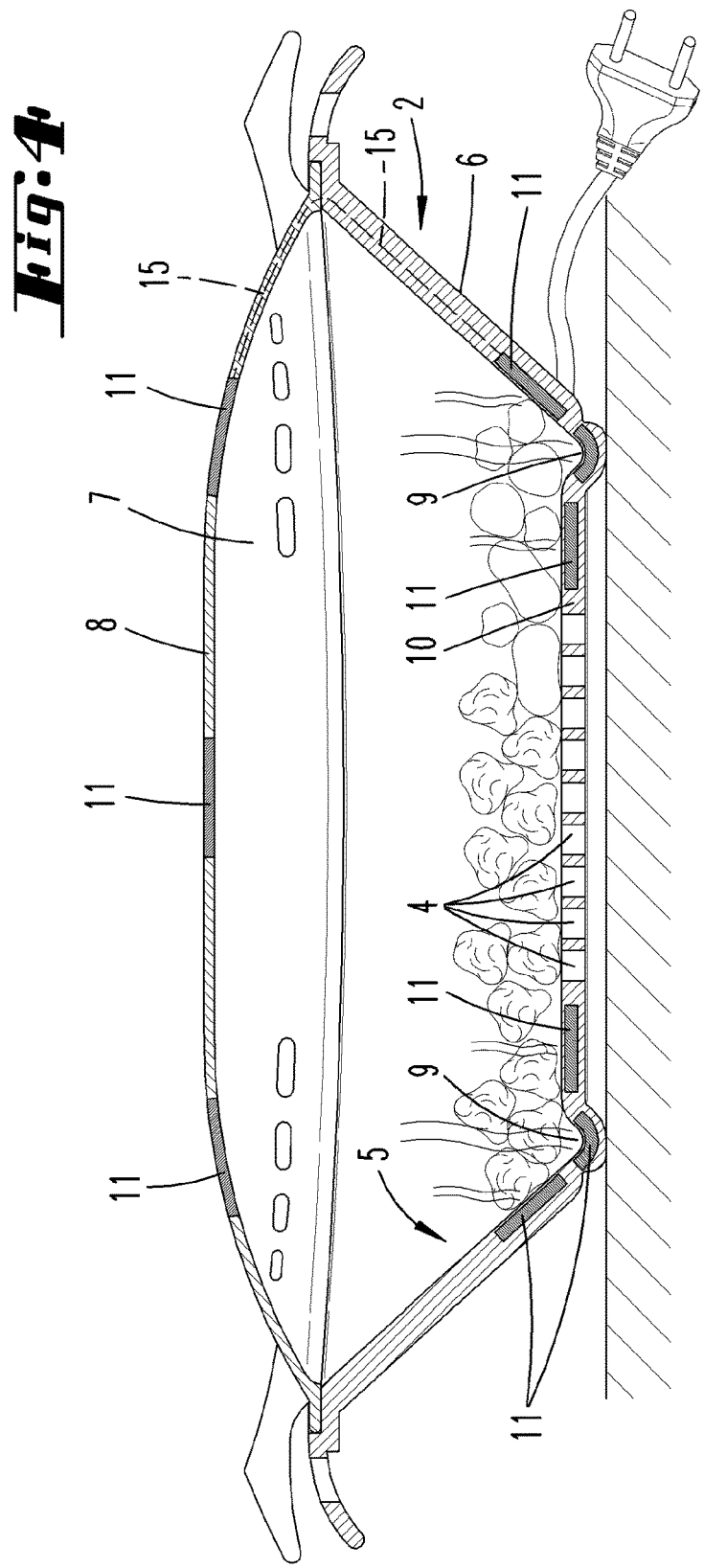

COOKING ATTACHMENT FOR A HEATABLE VESSEL OF A FOOD PROCESSOR

CROSS REFERENCE TO RELATED APPLICATIONS

This application is the National Stage of PCT/EP2015/069125 filed on Aug. 20, 2015, which claims priority under 35 U.S.C. § 119 of German Application No. 10 2014 112 959.8 filed on Sep. 9, 2014, the disclosures of which are incorporated by reference. The international application under PCT article 21(2) was not published in English.

The invention relates to a cooking attachment for a heatable vessel of a food processor, wherein said cooking attachment features one or more bottom openings, through which steam exiting the vessel can enter the cooking attachment and condensate can flow from the cooking attachment into the vessel.

Cooking attachments of the aforementioned type are known from the prior art. For example, publication DE 10 2011 000 452 A1 discloses an electric food processor with a heatable agitator vessel and a cooking attachment that can be attached to the agitator vessel, wherein perforations are partially arranged in the bottom region of the cooking attachment and steam from the agitator vessel can enter the cooking attachment through these perforations. Condensate forming within the cooking attachment can in turn flow back into the agitator vessel through the perforations.

Based on this prior art, the invention aims to enhance the cooking attachment in such a way that foods contained in the cooking attachment can be cooked optimally, i.e. faster and more evenly, and/or kept hot following preparation irrespective of their position within the cooking attachment.

According to the invention, this objective is attained in that the cooking attachment features a heating device that provides heating irrespective of the steam exiting the vessel.

The inventive cooking attachment features a heating device that heats the foods contained in the cooking attachment irrespective of the steam flow entering the cooking attachment from the vessel. The cooking process can thereby be advantageously accelerated. The inventive heating device can be operated separately or additionally to the steam heating.

In contrast to the steam heating, the function of the heating device is not dependent on a certain orientation of the cooking attachment relative to the heatable vessel. The heating device may furthermore be arranged in different positions in or on the cooking attachment such that foods arranged distant from the heatable vessel can be heated just as fast as foods arranged in the vicinity of the heatable vessel.

Since the heating device operates irrespective of the steam exiting the vessel, the cooking process within the cooking attachment can already begin when a liquid contained in the heatable vessel is not boiling yet such that no steam enters the cooking attachment. Due to the inventive heating device, the cooking attachment is not dependent on the generation of steam within the vessel.

Due to the increased temperature generated by means of the heating device, the steam present in the cooking attachment also advantageously condensates later or initially condensates on colder foods rather than on the wall of the cooking attachment. This causes a direct heat transfer to the foods.

Last but not least, the heating device advantageously makes it possible to also utilize the cooking attachment as an actively heated heat retaining vessel. Consequently, the cooking attachment can be used by itself independently of the food processor or the heatable vessel of the food processor such that the cooking attachment can advantageously fulfill a dual function.

All conceivable types of heaters, which are suitable for being installed in or on the cooking attachment and for expediently cooking or heating foods, may basically be considered for the inventive heating device. For example, they may consist of induction heaters with a corresponding periphery for generating eddy currents, tubular heating elements, thick-film heating elements, convection heaters and the like.

It is proposed that the cooking attachment has a cooking attachment wall, wherein the heating device is arranged in or on the cooking attachment wall. The heating device may be realized, for example, in the form of a resistance heater, wherein a heating element or multiple heating elements may be arranged in or on the cooking attachment wall. For example, the heating elements may be arranged in the cooking attachment wall in an annular or strip-shaped fashion. The heating elements may be arranged in the cooking attachment wall in such a way that they are completely embedded in the material of the cooking attachment wall and therefore do not come in contact with the foods to be prepared. However, it is alternatively also possible that the heating elements form part of the inner wall of the cooking attachment such that they directly come in contact with the foods. The heating elements may likewise be arranged inside or outside the food preparation space of the cooking attachment. In any case, the heating device can either heat the foods directly or indirectly, wherein the cooking attachment wall is initially heated in an indirect heating arrangement and the cooking attachment wall subsequently transfers thermal energy to the foods adjoining the cooking attachment wall.

It is furthermore proposed that the cooking attachment features a lid with a lid wall, wherein the heating device is arranged in or on the lid wall. The heated lid can also be advantageously used in connection with the above-described heated cooking attachment wall such that the foods contained in the cooking attachment are heated from all sides. In this way, a particularly homogenous cooking result and a short preparation time can be achieved. This embodiment is also particularly suitable for scalloping or grilling foods. The heating device may also be arranged in or on the lid wall as described above with reference to the heated cooking attachment wall, wherein the heating elements are either embedded in the material of the lid or arranged outside the lid wall.

It is furthermore proposed that the cooking attachment features an insertable base, wherein the heating device is arranged in or on the insertable base. The cooking attachment may particularly also feature multiple insertable bases that can be arranged on top of one another within the cooking attachment in such a way that different levels for arranging foods to be cooked are formed. For example, foods requiring a lower cooking temperature can be arranged on an upper insertable base whereas foods requiring a high cooking temperature may be arranged on a lower insertable base or directly on a bottom region of the cooking attachment. The heating device may be embedded in the insertable base or arranged on the outside thereof. Depending on the specific design, thermal energy can thereby be emitted upward and/or downward (from the plane of the insertable base).

The invention makes it possible to position the heating device in or on the cooking attachment in a particularly flexible fashion. The heating device may be divided into individual partial elements that are separately arranged on the cooking attachment wall, the lid wall and/or the insertable base. In this way, different temperature zones can be produced and, if applicable, also individually controlled depending on the position and number of partial elements used. Different foods can therefore be prepared in accordance with the most suitable cooking process. Due to the different temperature zones, it is likewise possible to simultaneously complete the preparation of different foods at a desired point in time.

The heating device may be arranged in or on the cooking attachment over its entire surface area or only parts thereof. Furthermore, the heating device can also be controlled separately as a whole or with respect to each individual partial element or multiple partial elements of the heating device. In addition, the heating device may either be activated or deactivated manually by a user or automatically by a control of the food processor. For example, the heating process may take place intermittently or permanently, as well is in dependence on certain preparation phases of the recipe. The heating device can be operated, for example, while water is heated within the heatable vessel of the food processor such that the time required for reaching the boiling point can be used for cooking (preheating) the foods by means of the heating device. All in all, a shorter overall cooking time/preparation time is thereby achieved.

The cooking attachment and/or the insertable base may feature a channel that is designed for collecting liquid, in particular, in the form of condensate forming in the cooking attachment and/or liquid originating from the foods contained in the cooking attachment. The cooking attachment and/or, if applicable, an insertable base of the cooking attachment therefore features a channel, in which condensate or liquid originating from the foods can be collected. The liquid may alternatively also be manually filled into the channel. The condensate or the liquid can be heated and evaporated such that it is still available for the cooking process within the cooking attachment. Consequently, the condensate/the liquid does not have to be returned into the heatable vessel in order to be once again evaporated therein.

The channel and/or a peripheral region adjacent to the channel can be purposefully heated in order to evaporate at least part of the condensate/the liquid. The utilization of the inventive channel is particularly advantageous when the cooking attachment is used exclusively as a heat retaining vessel and separately of the heatable vessel of the food processor. In this case, the condensate or the liquid contained in the channel is evaporated by means of the heating device such that the foods can be kept hot and moist with the aid of the hot steam and the cooking attachment can thereby fulfill a heat retaining function.

The inventive channel may be formed in the cooking attachment wall. In this case, the cooking attachment wall features, for example, a channel-shaped recess, in which liquid can be collected. However, it is likewise possible that the cooking attachment wall as such is not changed, but a separate channel is rather arranged on the cooking attachment wall. In both instances, the channel can be advantageously realized in such a way that it annularly defines a bottom region of the cooking attachment wall. The channel advantageously extends between the bottom region and a lateral region of the cooking attachment in this case. Condensate forming within the cooking attachment advantageously flows down along the lateral regions and into the channel, in which it can ultimately be evaporated once again by means of a heating device arranged in the region of the channel. The channel may be realized in the form of a complete ring or alternatively in the form of a ring segment. The channel can furthermore be heated in its entirety or in certain sections only. If this furthermore also possible to purposefully guide condensate or liquid into certain regions of the channel.

In any case, it is proposed that the heating device comprises a plurality of partial elements that are arranged in or on the cooking attachment wall and/or the lid wall and/or the insertable base.

In addition to the above-described cooking attachment, the invention also proposes a food processor, particularly a cooking and mixing utensil, with an inventive cooking attachment.

The invention ultimately also proposes a method for preparing and/or keeping foods hot within a cooking attachment, particularly within an inventive cooking attachment of the above-described type, wherein liquid contained within a channel formed in the cooking attachment is evaporated by means of a heating device assigned to the channel, and wherein the channel particularly surrounds the foods annularly such that steam rising from the channel moistens and/or heats the surfaces of the foods, which are not in contact with the cooking attachment and/or an insertable base thereof. The inventive method, in which liquid is evaporated from a channel formed in the bottom region of the cooking attachment, can be used for preparing foods, as well as for keeping foods hot. Accordingly, the inventive method naturally can not only be applied to cooking attachments in the strict sense of the word, but also to heat retaining vessels that feature such a channel. In this context, it is vital that a heating device is assigned to the channel in order to generate steam, wherein said heating device evaporates liquid contained in the channel such that the foods contained in the cooking attachment or the heat retaining vessel are moistened and/or heated. A steam dome surrounding the foods is advantageously formed due to the annular configuration of the channel in the bottom region of the cooking attachment. The inventive method is insofar suitable, for example, for stand-alone devices for keeping foods hot, as well as for food preparation devices, particularly devices for cooking or preheating foods.

The liquid contained in the channel may furthermore consist of condensate formed during the previous preparation of the foods within the cooking attachment, particularly a steaming process. According to this embodiment of the method, the liquid does not have to be manually filled into the channel, but rather consists of condensate formed during the previous preparation of the foods within the cooking attachment, i.e. within the same vessel. Consequently, the same vessel can be initially used for preparing foods and subsequently for keeping the foods hot—after their preparation is completed.

The cooking attachment is advantageously attached to a heatable vessel of a food processor while the foods are prepared, wherein steam exiting the vessel can enter the cooking attachment through openings arranged in the bottom region of the cooking attachment. The foods are therefore prepared within the cooking attachment in combination with a second vessel, which serves as primary steam source for generating and conveying steam into the cooking attachment. The steam entering the cooking attachment condensates on the inner wall of the cooking attachment and/or the foods contained in the cooking attachment and flows into the channel, in which the condensate can ultimately be evaporated once again by means of a heating device arranged in the region of the channel in a subsequent step of the method.

In this case, the evaporation from the channel can be used for preparing and/or keeping foods hot in addition to the steam rising from the heatable vessel of the food processor or independently thereof. In the latter instance, the cooking attachment can be separated from the heatable vessel of the food processor and used as a stand-alone device for preparing and/or keeping foods hot.

In other respects, all advantages and characteristics described above with reference to the cooking attachment with channel also apply to the inventive method and vise versa. For example, the invention can also be analogously used in connection with a channel that is not formed in the bottom region of the cooking attachment, but rather in an insertable base arranged in the cooking attachment.

Exemplary embodiments of the invention are described in greater detail below. In the corresponding drawings:

FIG. 1 shows a food processor with a vessel and a cooking attachment arranged thereon, FIG. 2 shows a section through a part of the vessel with a cooking attachment according to a first embodiment arranged thereon, FIG. 3 shows a section through a part of the vessel with a cooking attachment according to a second embodiment arranged thereon, and FIG. 4 shows a section through a cooking attachment according to a third embodiment.

FIG. 1 shows a food processor 1 that is realized, for example, in the form of a cooking and mixing utensil in this case. The food processor 1 features a vessel 3 (in this case an agitator vessel) with a lid 12. The lid 12 has a central lid opening 13, through which steam generated in the vessel 3 can flow into a cooking attachment 2 arranged on the vessel 3.

The cooking attachment 2 is closed with a lid 7 that, if applicable, has openings for allowing steam to escape. Furthermore, a (not-shown) heater is assigned to the vessel 3 in order to heat the vessel 3. If applicable, an agitator is also arranged in the vessel 3.

The section illustrated in FIG. 2 shows an upper part of the vessel 3 with the lid 12, as well as the cooking attachment 2 with the lid 7. The lid 12 at least partially closes the vessel 3, wherein the central lid opening 13 provided in the lid 12 enables steam to flow from the vessel 3 into the cooking attachment 2.

The cooking attachment 2 has a cooking attachment wall 6, within which a heating device 5 with multiple partial elements 11 is arranged. Furthermore, a channel 9 is arranged in a bottom region 10 of the cooking attachment 2 and essentially surrounds the bottom region 10 of the cooking attachment 2 annularly. The partial elements 11 of the heating device 5 are likewise configured annularly and extend parallel to one another in planes arranged on top of one another. Furthermore, the bottom region 10 of the cooking attachment 2 also features an annular partial element 11 that is arranged within the ring formed by the channel 9. The heating device 5 may be realized, for example, in the form of an electric resistance heater with individual resistor elements, wherein the resistor elements represent partial elements 11 as defined by the invention. The cooking attachment 2 features a power connection for supplying the heating device 5 with power. Although the cooking attachment 2 features its own power plug in the exemplary embodiments shown, the heating device 5 of the cooking attachment 2 may alternatively also be supplied with power by means of the food processor 1 and/or the heatable vessel 3. If the cooking attachment 2 features an independent power supply, the cooking attachment 2 can be advantageously used in the form of a stand-alone device and therefore independently of the food processor 1 and/or the heatable vessel 3.

According to FIG. 3, the cooking attachment 2 may feature an insertable base 14 (or more than one insertable base), which likewise features partial elements 11 of the heating device 5. The partial elements 11 are advantageously arranged in the bottom region of the insertable base 14, as well as in the lateral region thereof. The cooking attachment 2 and the insertable base 14 are supplied with power by means of the food processor 1. For this purpose, the food processor 1, the vessel 3, the lid 12, the cooking attachment wall 6 and, if applicable, the insertable base feature electric lines 15. Corresponding electric contacts are arranged at the interfaces between the food processor 1 and the vessel 3, between the vessel 3 and the lid 12, between the lid 12 and the cooking attachment 2 and, if applicable, between the cooking attachment 2 and the insertable base 14 in order to ensure the electric power supply.

FIG. 4 shows a cooking attachment 2 individually, i.e. the cooking attachment 2 is not connected to a heatable vessel 3 of a food processor 1. The cooking attachment 2 shown features a channel 9 that annularly surrounds a bottom region 10 of the cooking attachment 2. Partial elements 11 of a heating device 5 are assigned to the channel 9, as well as to adjacent areas of the bottom region 10 and the cooking attachment wall 6. The cooking attachment 2 features a power connection for realizing its power supply. The lid 7 of the cooking attachment 2 likewise features a heating device 5 with multiple partial elements 11, wherein the lid 7 is connected to the power supply of the cooking attachment 2 by means of corresponding contacts and electric lines 15.

According to the invention, the user of the food processor 1 fills the vessel 3 with a liquid, for example with water, and closes the food processor with the lid 12. The cooking attachment 2 is then arranged on the lid 12. Foods to be cooked are placed into the cooking attachment 2. The cooking attachment 2 is then closed with the lid 7. If applicable, one or more insertable bases 14 may also be placed into the cooking attachment 2 such that multiple levels are formed within the cooking attachment 2.

The liquid contained in the vessel 3 is heated by means of a heater assigned to the vessel 3. As soon as the boiling point of the liquid is reached, steam rises from the vessel 3 and escapes through the lid opening 13. The steam reaches the food preparation space of the cooking attachment 2 through the bottom openings 4 thereof such that the cooking attachment wall 6 and the foods contained in the cooking attachment 2 are heated.

Since a certain time period is required until steam is generated within the vessel 3, the user can additionally activate the heating device 5 in order to preheat the foods contained in the cooking attachment 2. The heating device 5 consists of a resistance heater, the heating resistors of which are embedded into the material of the cooking attachment wall 6. In this case, the individual partial elements 11 (heating resistors) of the heating device 5 can be controlled independently of one another such that different temperature zones can be realized within the cooking attachment 2. For example, the uppermost partial element 11 arranged adjacent to the lid 7 may have a higher temperature than the partial element 11 lying underneath. If one or more insertable bases 14 (if applicable with their own partial elements 11) are assigned to the cooking attachment 2, multiple levels can be heated with different temperatures. Different types of food can be arranged on each level, wherein fish can be arranged, for example, on a lower level and vegetables can be arranged on an upper level. Due to the plurality of partial elements 11, the preparation of the foods contained in the cooking attachment 2 can also be simultaneously completed if their properties deviate from one another.

The heating device 5 may either be activated and deactivated manually by the user or automatically by a control of the food processor 1. If an automatic control is used, the heating device 5 can be controlled in dependence on a current preparation progress of a recipe.

According to the exemplary embodiment illustrated in FIG. 4, the lid 7 of the cooking attachment 2 may also feature a heating device 5 with one or more partial elements 11. The partial elements 11 may be arranged in or on the lid wall 8 of the lid 7 in such a way that they emit thermal energy in the direction of the food preparation space of the cooking attachment 2. For example, foods can thereby be advantageously scalloped with cheese or also grilled. The partial elements 11 arranged in the lid 7 are advantageously supplied with power by means of the power connection of the cooking attachment 2.

As soon as the water contained in the vessel 3 evaporates, the foods contained in the cooking attachment 2 are cooked by the steam, as well as by the heating device 5. If applicable, the heating device 5 can be deactivated at this point such that the foods are then heated by the steam only.

As soon as the preparation of the foods is completed, the heater assigned to the vessel 3 is deactivated such that the transfer of steam from the vessel 3 into the cooking attachment 2 is stopped. The foods can now be removed from the cooking attachment 2 and arranged on a plate by the user.

The cooking attachment 2 can be used as a heat retaining vessel if the user does not intend to remove the foods from the cooking attachment 2 immediately after their preparation. In this case, the heating device 5 is operated in a heat retaining mode. The cooking attachment 2 may remain attached to the vessel 3 (as illustrated in FIG. 2 or 3) or be removed from the vessel 3 (as illustrated in FIG. 4) in this heat retaining mode.

In order to prevent the foods arranged in the cooking attachment 2 from drying out in the heat retaining mode, a liquid such as, for example, condensate collected during a previous evaporation cycle is evaporated in the channel 9 formed in the bottom region 10 of the cooking attachment 2. For this purpose, the liquid collected in the channel 9 is heated by means of the partial element 11 arranged closest to the channel 9. The heating process causes the liquid to evaporate such that the foods within the cooking attachment 2 are heated on the one hand and kept moist on the other hand. Premature cooling and drying-out of the foods can thereby be prevented or at least delayed. As an alternative to the collected condensate, the liquid may also consist of liquid originating from the foods or separately added liquid.

The channel 9 can be selectively heated by means of the assigned partial element 11 in the heat retaining mode of the cooking attachment 2 only, as well as during the previous preparation of the foods.

REFERENCE LIST

1 Food processor
2 Cooking attachment
3 Vessel
4 Bottom opening
5 Heating device
6 Cooking attachment wall
7 Lid
8 Lid wall
9 Channel
10 Bottom region
11 Partial element
12 Vessel lid
13 Vessel lid opening
14 Insertable base
15 Electric line

The invention claimed is:

1. A cooking attachment (2) for a heatable vessel (3) of a food processor (1), wherein said cooking attachment (2) comprises:
   a cooking attachment wall,
   a lid with a lid wall,
   an insertable base
   one or more bottom openings (4), through which steam exiting the vessel (3) can enter the cooking attachment (2) and condensate can flow from the cooking attachment (2) into the vessel (3),
   a heating device (5), which provides heating irrespective of steam exiting the vessel (3), and
   a plurality of partial elements of the heating device, which are arranged separately in or on the cooking attachment wall and/or the lid wall and/or the insertable base, the partial elements producing different temperature zones that can be individually controlled.

2. The cooking attachment (2) according to claim 1, wherein the cooking attachment (2) and/or the insertable base (14) comprises a channel (9), which is designed for collecting liquid in the form of condensate forming in the cooking attachment (2) and/or liquid originating from the foods contained in the cooking attachment (2).

3. The cooking attachment (2) according to claim 2, wherein the channel (9) is formed in the cooking attachment wall (6) and annularly defines a bottom region (10) of the cooking attachment wall (6).

4. The cooking attachment (2) according to claim 2 wherein the heating device (5) is assigned to the channel (9).

5. The cooking attachment (2) according to claim 1, wherein the heating device (5) comprises an induction and/or convection heater.

6. A food processor with a cooking attachment (2) according to claim 1.

7. A method for preparing and/or keeping foods hot within a cooking attachment, comprising:
   attaching the cooking attachment to a heatable vessel of a food processor while the foods are prepared, wherein steam exiting the vessel can enter the cooking attachment through openings arranged in the bottom region of the cooking attachment,
   heating the food in the cooking attachment with a heating device, the cooking attachment features a heating device, which provides heating irrespective of the steam exiting the vessel, and
   producing different temperature zones in the cooking attachment via a plurality of partial elements of the heating device, which are arranged separately in or on a cooking attachment wall and/or a lid wall and/or an insertable base.

8. A method according to claim 7, wherein liquid contained within a channel (9) formed in the cooking attachment (2) is evaporated by means of a heating device (5) assigned to the channel (9), wherein the channel (9) surrounds the foods annularly such that steam rising from the channel (9) moistens and/or heats the surfaces of the foods, which are not in contact with the cooking attachment (2) and/or the insertable base (14) of the cooking attachment (2).

9. The method according to claim 8, wherein the liquid contained in the channel consists of condensate formed during previous preparation of the foods within the cooking attachment.

* * * * *